United States Patent
Brabb et al.

(10) Patent No.: US 6,619,452 B1
(45) Date of Patent: Sep. 16, 2003

(54) HOUSING FOR A HAND BRAKE MECHANISM

(75) Inventors: David C. Brabb, Chicago, IL (US); Wajih Kanjo, Lockport, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/629,333

(22) Filed: Aug. 1, 2000

(51) Int. Cl.[7] ............................................. B61H 13/34
(52) U.S. Cl. ........................... 192/16; 74/505; 188/33; 384/439
(58) Field of Search ...................... 192/15, 16; 74/505; 188/33; 384/439, 428

(56) References Cited

U.S. PATENT DOCUMENTS

| | | | | |
|---|---|---|---|---|
| 1,870,985 A | * | 8/1932 | Burnett | 74/505 |
| 2,150,742 A | * | 3/1939 | Lindeman | 74/505 |
| 2,166,256 A | * | 7/1939 | Lindeman | 74/505 |
| 3,258,991 A | * | 7/1966 | Bezlaj | 74/505 |
| 3,425,294 A | * | 2/1969 | Klasing | 74/505 |
| 3,668,944 A | | 6/1972 | Natschke | |
| 3,923,287 A | | 12/1975 | Weseloh et al. | |
| 3,966,275 A | * | 6/1976 | Cain et al. | 384/428 |
| 3,998,430 A | | 12/1976 | Weseloh | |
| 4,301,693 A | * | 11/1981 | Stanley | 74/505 |
| 5,127,283 A | | 7/1992 | O'Brien et al. | |
| 5,129,740 A | * | 7/1992 | Matsushita et al. | 384/439 X |
| 6,053,072 A | * | 4/2000 | Schleuder | 74/606 R |
| 6,179,093 B1 | * | 1/2001 | Daugherty, Jr. | 188/33 |

* cited by examiner

*Primary Examiner*—Rodney H Bonck
(74) *Attorney, Agent, or Firm*—James Ray & Associates

(57) ABSTRACT

A hand brake front housing for a railroad car hand brake mechanism. Such hand brake front housing comprising a front casing for enclosing pre-selected portions of a hand brake mechanism. The front casing having a front wall of a predetermined size and shape. A bearing mount integrally formed to the front wall of such front casing. The bearing mount having a predetermined size and shape to retain a predetermined arrangement of a bearing unit.

12 Claims, 2 Drawing Sheets

HOUSING FOR A HAND BRAKE MECHANISM

FIELD OF THE INVENTION

The present invention relates, in general, to a housing for a hand brake mechanism and, more particularly, this invention relates to a one piece housing with a bearing mount that is integrally formed to the housing body.

BACKGROUND OF THE INVENTION

Prior to the present invention, a hand brake mechanism is enclosed in a housing that consists of a separate bearing mount that is attached to the wall of the front casing. The attachment is typically accomplished by either welding around the circumference of the bearing mount at the juncture between the bearing mount and hand brake housing front wall, or by pressing and crimping the bearing mount onto the hand brake housing. There are several disadvantages to this arrangement. Two separate components must be designed and manufactured to close dimensional tolerance requirements to ensure proper alignment of the two components. Production costs are increased as a result of manufacturing two components. Further, an additional production step is required to assemble and fasten the two components together. Poor quality is a cost factor due to a potential error in misaligned bearing mount, inferior welding or crimping that results in product rework or scrap. Finally, the potential for failure may exist in service due to a poor weld or faulty crimp.

SUMMARY OF THE INVENTION

In a first aspect, the present invention provides a device for a hand brake front housing for a railroad car hand brake mechanism. The housing includes a front casing for enclosing pre-selected portions of a hand brake mechanism. The front casing has a front wall of a predetermined size and shape. A bearing mount is integrally formed to the front wall of the front casing. The bearing mount has a predetermined size and shape to retain a predetermined arrangement of a bearing unit.

In a further aspect, the present invention provides for a hand brake front housing member in combination with a hand brake mechanism and a back plate engageable with a railway car. The hand brake mechanism includes a brake chain and drum, brake release mechanism, gear mechanism, ratchet device, brake operating mechanism, clutch device, and release mechanism. The improvement comprises a front housing member with an integrally formed bearing mount.

OBJECTS OF THE INVENTION

It is therefore a primary object of the present invention to provide a hand brake front housing in which a front casing is formed with an integral bearing mount.

It is a further object of the present invention to provide a front housing member with an integrally formed bearing mount in combination with a hand brake mechanism having a back plate engageable with a railway car.

Still a further object of the present invention is to provide a front housing member with an integrally formed bearing mount which will enable a reduction of manufacturing costs by reducing the number of parts.

Still a further object of the present invention is to provide a front housing member with an integrally formed bearing mount which will enable a reduction of manufacturing costs by reducing the assembly time.

Still a further object of the present invention is to provide a front housing member with an integrally formed bearing mount which will increase product quality and integrity by substantially minimizing potential part misalignment, defective welds or crimping.

In addition to the various objects of the invention that have been described above, various other objects and advantages of the invention will become more readily apparent to those persons skilled in the relevant art from the following more detailed description of the invention, particularly, when such description is taken in conjunction with the attached drawing figures and the appended claims.

BRIEF DESCRIPTION OF A PRESENTLY PREFERRED

AND VARIOUS ALTERNATIVE EMBODIMENTS OF THE PRESENT INVENTION

Figure 1:
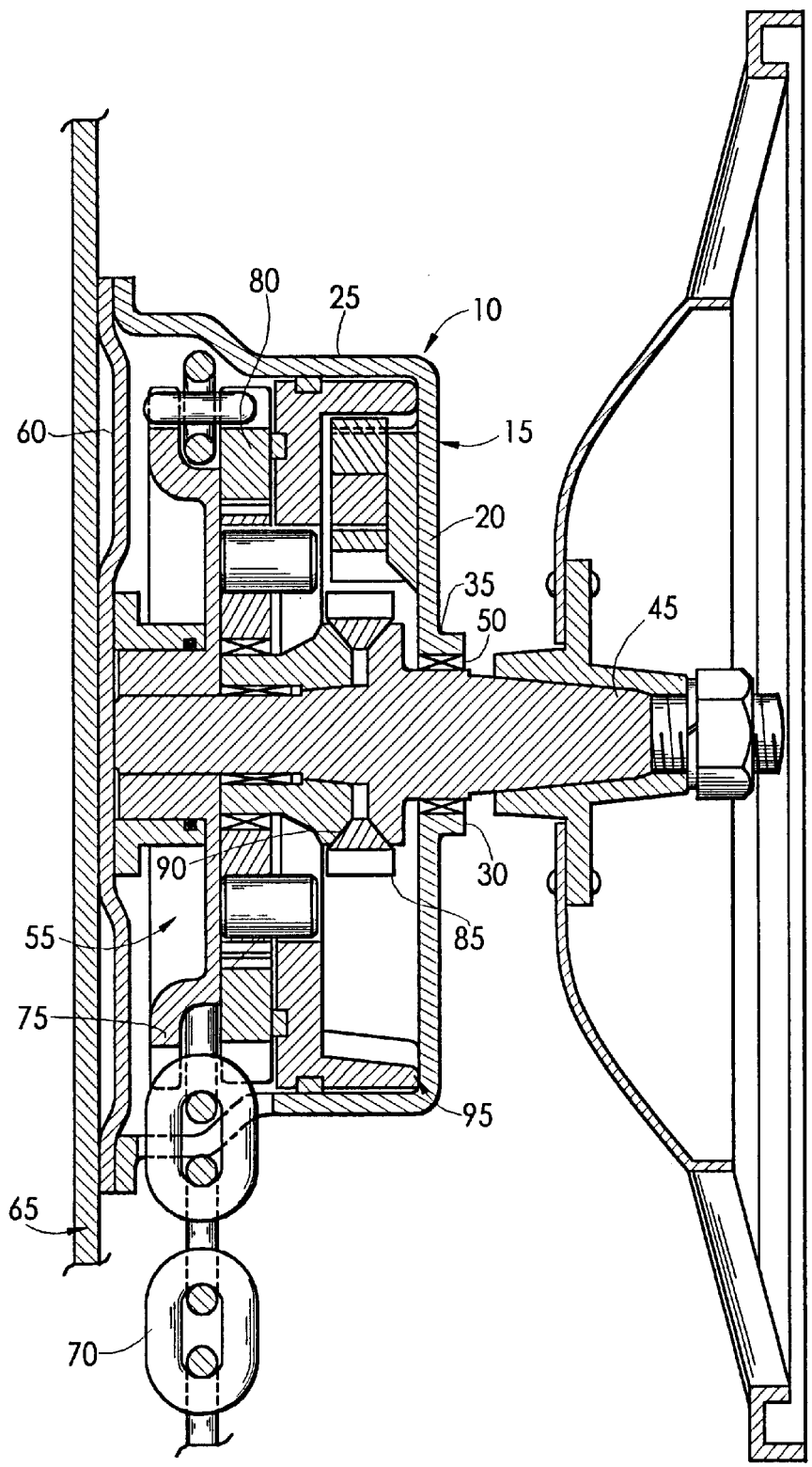
FIG. 1 is a diagrammatic sectional side view of a presently preferred embodiment of a hand brake with the improved housing.

Prior to proceeding to a more detailed description of the invention, it should be noted that identical components having identical functions have been designated with identical reference numerals for the sake of clarity.

Figure 2:
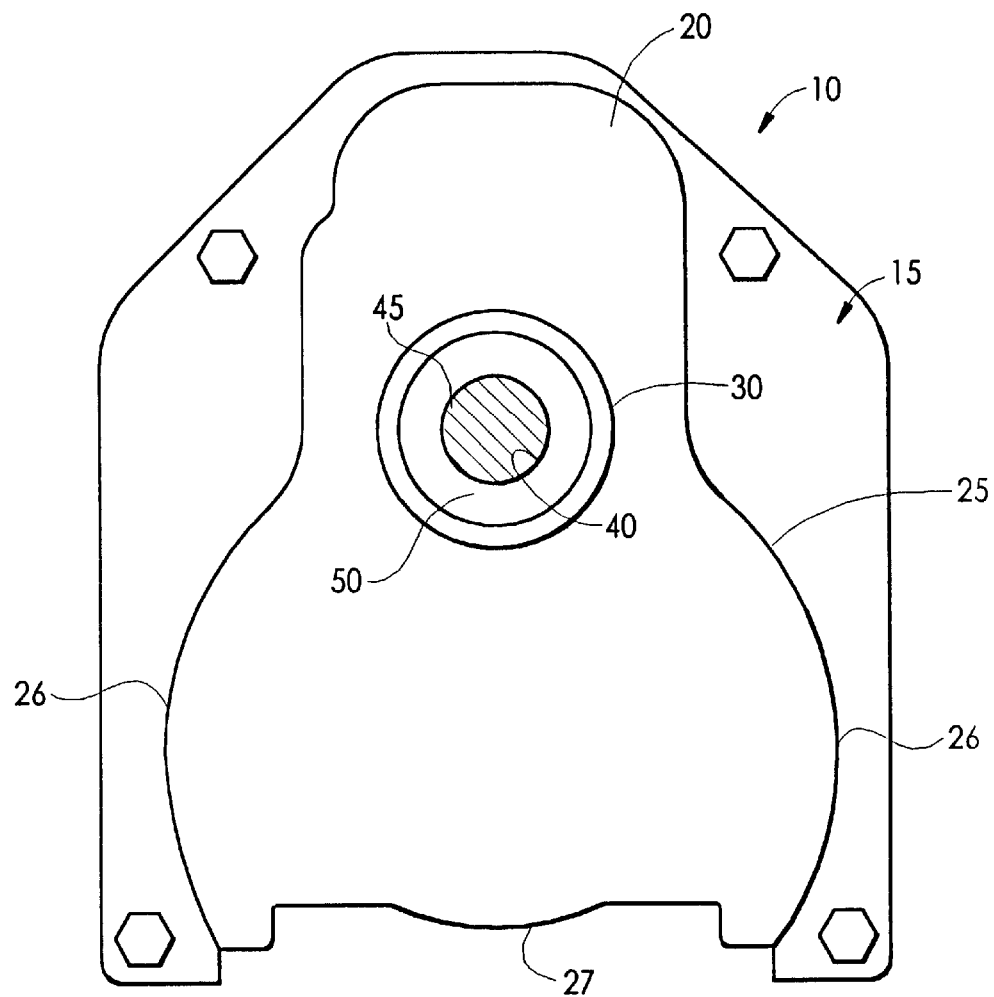
FIG. 2 is a front view of a hand brake.

Now refer more particularly to FIGS. 1 and 2 of the drawings. Illustrated therein is a housing, generally designated 10, for a railroad car hand brake mechanism, comprising a front casing, generally designated 15 for enclosing pre-selected portions of a hand brake mechanism. The front casing 15 further includes a front wall 20 having a predetermined size and shape, and a side wall portion 25 having a predetermined size and shape. Preferably, the side wall portion 25 includes a plurality of arcuate portions 26, and the front casing 15 is substantially open adjacent a bottom 27 of the side wall portion 25. The front casing 15 is a stamping, and the stamping is metal. Preferably, the metal is steel.

A bearing mount 30 is integrally formed to the front wall 20 of the front casing 15. The bearing mount 30 has a predetermined size and shape to retain a predetermined arrangement of a bearing unit 50. The front casing 20 further includes a radius 35 of a predetermined size, which joins the bearing mount 30 to the front wall 20 of the front casing 15. Preferably, the bearing mount 30 is formed substantially perpendicular to the front wall 20.

The bearing mount 30 further includes an aperture 40 for receiving an operating shaft 45. Preferably, the aperture 40 is concentric about the bearing mount 30.

Now refer more particularly to FIG. 1. Illustrated therein, is a front housing member 10 with an integrally formed bearing mount 30 in combination with a hand brake mechanism, generally designated 55. The combination comprises a back plate 60 engageable with a mounting plate 65 on a railway car (not shown), a brake chain 70, a brake drum 75, a gear mechanism 80, a ratchet device 85, a clutch device 90, and a release mechanism 95.

The combination further includes a radius 35 of a predetermined size which joins the bearing mount 30 to the front wall 20 of the front casing 15. The housing member 10 of the combination has a side wall portion 25. Preferably, the side wall portion 25 includes a plurality of arcuate portions 26.

The bearing mount 30 in the combination is formed substantially perpendicular to the front wall 20. The combination further includes an aperture 40 in the bearing mount 30 for receiving an operating shaft 45. Preferably, the aperture 40 is concentric about the bearing mount 30 in the combination. Preferably, the front housing member 10 of the combination is a stamping, wherein the material is steel.

Although the invention has been shown in connection with a certain specific embodiment, it will be readily apparent to those skilled in the art that various changes in form and arrangement of parts and method may be made to suit requirements without departing from the spirit and scope of the invention.

We claim:

1. A hand brake front housing for a railroad car hand brake mechanism, said hand brake front housing comprising:
    (a) a front casing for enclosing pre-selected portions of a hand brake mechanism; said front casing having a front wall of a predetermined size and shape and a side wall portion extending inwardly and substantially perpendicular to said front wall;
    (b) a bearing mount integrally formed with said front wall of said front casing, said bearing mount including an outwardly protruding portion, which extends in a substantially perpendicular direction with respect to said front wall of said front casing so as to form a juncture between said bearing mount and said front wall which is a fillet of a predetermined radius, said bearing mount having a predetermined size and shape capable of encircling and retaining a predetermined arrangement of a bearing unit; and
    (c) an aperture formed through said front wall of said front casing adjacent said bearing mount, said aperture being an only opening in said front wall of said front casing, said front wall and said side wall portion of said front casing and said bearing mount formed as an integral single piece casing.

2. The housing according to claim 1 wherein said side wall portion includes a plurality of arcuate portions.

3. The housing according to claim 1 wherein said front casing is substantially open adjacent a bottom of said side wall portion.

4. The housing according to claim 1 wherein said aperture is concentric with said bearing mount.

5. The housing according to claim 1 wherein said hand brake front housing is a stamping.

6. The housing according to claim 5 wherein said stamping is metal.

7. The housing according to claim 6 wherein said metal is steel.

8. In combination with a hand brake mechanism having a back plate engageable with a railway car, a brake chain, brake drum, gear mechanism, ratchet device, clutch device, and release mechanism, the improvement comprising:
    (a) a front casing for enclosing pre-selected portions of a hand brake mechanism; said front casing having a front wall of a predetermined size and shape and a side wall portion extending inwardly and substantially perpendicular to said front wall;
    (b) a bearing mount integrally formed with said front wall of said front casing, said bearing mount including an outwardly protruding portion which extends in a substantially perpendicular direction with respect to said front wall of said front casing so as to form a juncture between said bearing mount and said front wall which is a fillet of a predetermined radius, said bearing mount having a predetermined size and shape capable of encircling and retaining a predetermined arrangement of a bearing unit; and
    (c) an aperture formed through said front wall of said front casing adjacent said bearing mount, said aperture being an only opening in said front wall of said front casing, said front wall and said side wall portion of said front casing and said bearing mount being formed as an integral single piece casing.

9. The combination according to claim 8 wherein said side wall portion includes a plurality of arcuate portions.

10. The combination according to claim 8 wherein said aperture is concentric with said bearing mount.

11. The combination according to claim 8 wherein said front housing member is a stamping.

12. The combination according to claim 11 wherein said stamping is metal.

* * * * *